(12) United States Patent
Antoff et al.

(10) Patent No.: US 6,641,112 B2
(45) Date of Patent: Nov. 4, 2003

(54) SEAT SUPPORT AND THREADED SEAT FOR VALVE WITH QUADRUPLE SEAT

(76) Inventors: Hector Alberto Antoff, Avenida del Pinar No. 2, Barrio Saavedra Km 3, Comodoro Rivadavia (CP 9005), Chubut (AR); Jorge Osvaldo Antoff, Avenida del Pinar No. 2, Barrio Saavedra Km 3, Comodoro Rivadavia (CP 9005), Chubut (AR)

( * ) Notice: Subject to any disclaimer, the term of this patent is extended or adjusted under 35 U.S.C. 154(b) by 9 days.

(21) Appl. No.: 10/104,101

(22) Filed: Mar. 21, 2002

(65) Prior Publication Data

US 2002/0134961 A1 Sep. 26, 2002

(30) Foreign Application Priority Data

Mar. 23, 2001 (AR) ..................................... P01 01 01363

(51) Int. Cl.[7] ................................................. F16K 1/42
(52) U.S. Cl. ...................................................... 251/363
(58) Field of Search .............................. 251/359, 360, 251/361, 362, 363; 137/533.21, 533.23, 533.25, 533.27, 533.29, 533.31

(56) References Cited

U.S. PATENT DOCUMENTS

| | | | | |
|---|---|---|---|---|
| 2,192,339 A | * | 3/1940 | Wilson | 251/363 X |
| 2,731,036 A | * | 1/1956 | Hughes | 251/363 X |
| 2,854,021 A | * | 9/1958 | Baldwin, Jr. et al. | 251/363 X |
| 2,982,515 A | * | 5/1961 | Rule | 251/359 X |
| 3,489,170 A | * | 1/1970 | Leman | 251/363 X |
| 3,746,305 A | * | 7/1973 | Zakka | 251/360 |
| 4,474,208 A | * | 10/1984 | Looney | 251/363 X |
| 4,542,879 A | * | 9/1985 | Stein | 251/360 |
| 5,113,898 A | * | 5/1992 | White et al. | 251/363 X |
| 5,247,960 A | * | 9/1993 | Kornfeldt et al. | 251/363 X |
| 5,758,682 A | * | 6/1998 | Cain | 251/360 X |

* cited by examiner

Primary Examiner—Gene Mancene
Assistant Examiner—Eric Keasel
(74) Attorney, Agent, or Firm—Bachman & LaPointe, P.C.

(57) ABSTRACT

Threaded seat support for valve with quadruple seal, such as aspiration and exhaust check valves used in reciprocating hydraulic pumps, wherein the threaded seat support cap is comprised by a planar frustoconical metal body, inside which a thread has been made at a central region comprised between the upper mouth forming a larger diameter chamber and a lower cylindrical region, of smaller diameter, defining a planar step adjacent the end of the thread fillet; while the valve body provides the seat at its upper surface, which has a larger diameter forming a projecting peripheral edge, followed by a cylindrical strip of smaller diameter which has a peripheral channel carrying an O-ring; following the cylindrical strip thread fillets are arranged at a smaller diameter region; while that inside the valve body there is an axial drill for a guide rod of the blocking disk of the valve, surrounded by the fluid passage conduits; the bodies of the threaded seat, of the blocking disk and, at least partially, of the guide rod, are made by a crystalline homopolymer acetal resin (Delrin) or by a long chain synthetic polymer amide with periodical amide groups ad a part of the main chain (Nylon), defining the assembly at least four tight seals.

7 Claims, 2 Drawing Sheets

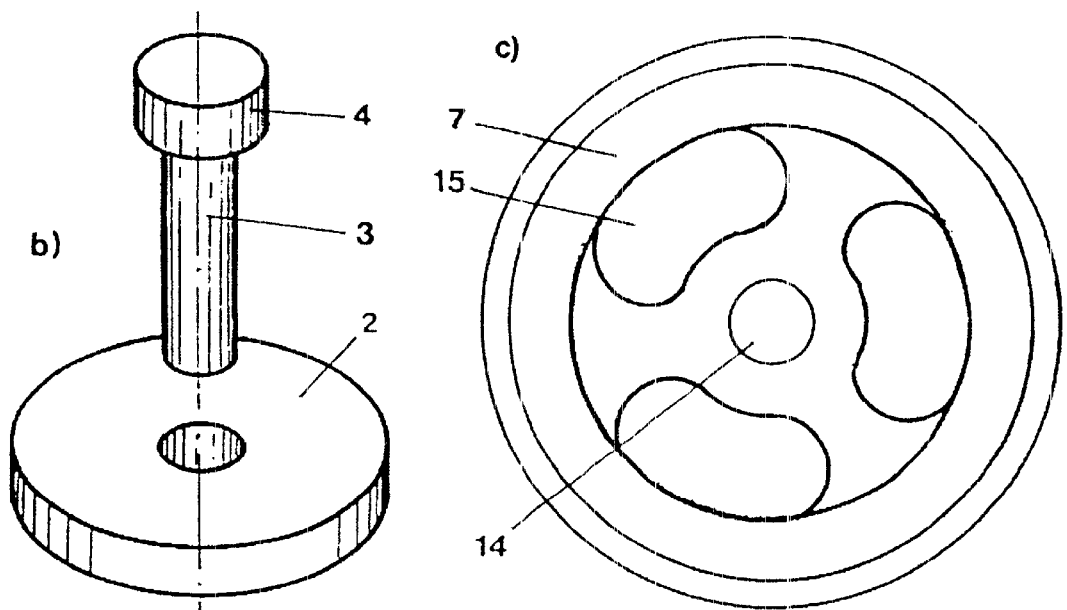
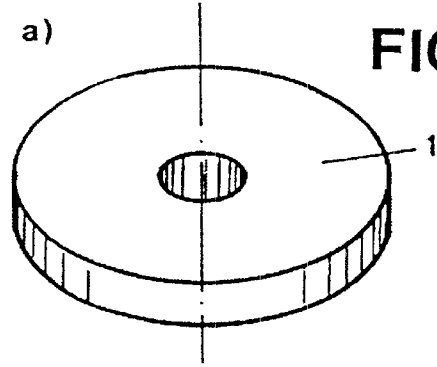
FIG. 3   FIG. 4
FIG. 5
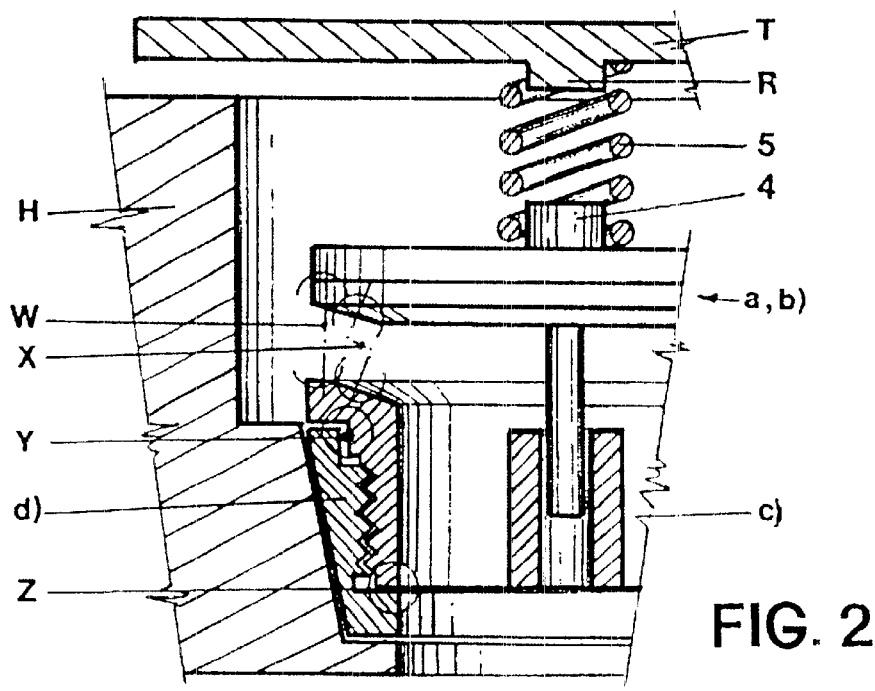
FIG. 2

SEAT SUPPORT AND THREADED SEAT FOR VALVE WITH QUADRUPLE SEAT

FIELD OF THE INVENTION

The invention relates to valves and valve seats, of the type used in general in hydraulic bodies for piston reciprocating pumps, being their main object the provision of an optimized valve and valve seat wherein a quadruple seal is provided assuring the closure tightness under all working conditions.

An important object of the instant invention is the arrangement which specially takes into account the assembling and disassembling operations for maintenance purposes, particularly in critical and severe installation requirements, as is the case in oil wells.

The main problem inherent to equipment employed in oil fields, including reciprocating pumps, is that originated by the valves used in the crude oil pumping circuit. The extremely severe operating conditions are strongly influenced by several factors such as temperature, pressures higher than those of the equipment, the aggression of the product per se and of materials such as sand, sludge, water and bacterial attack. These factors produce the quick wear of the valves included in the pumping hydraulic circuit and affect these valves such that they should be replaced after periods of time so short as 30 days.

This disadvantage is of concern since it affects production when the valve is not replaced at the proper time, further including the labor cost and that of spare parts. This situation is particularly notorious in those wells subject to recovery techniques, wherein water of the formation is sometimes injected, which increases the natural temperature of the product stored deep into the earth, which is commonly of higher viscosity. As a consequence the great amount of water, sludge and sand entrained quickly corrode the seats and valves of the equipment, thus turning it inoperative due to the high economic losses involved.

On the other hand, the relatively high temperatures involved result in dilatation of the pump body and of the valve seat support, which allows displacement of the seal away from its normal position, thus completely destroying its action.

Sometimes, the failure is produced at the tank level control, this resulting in overflow or emptying thereof. The filter blocking causes low suction and the corresponding negative hydraulic pressure, thus stopping the pumping action.

The above mentioned disadvantages result in the mandatory disassembly of the valve body to replace the valve and its seat. Frequently, the metal seat is nailed to the body, removal thereof being extremely difficult, requiring the use of large lever removers, heat dilatation of the body using a torch and removal of the seat, in some cases by oxy-cut. All these tasks increase cost and also the time involved in repairing the valve, thus decreasing safety.

The object of the invention is to facilitate maintenance operation and reduce the frequency between subsequent replacements, due to the fact that its special structure increases duration of the arrangement, specially in the cases of extremely severe operative conditions, as mentioned.

An additional object of the arrangement of the invention is its use as a spare part for any kind of pump employing seats and valves of the mentioned kind. Therefore, the shape and dimensions of the seat and of the valve per se are maintained, and the elements are manufactured in this case in three basic sizes to comply with the existing equipment. The only modification required could be the part of the body seat support which is adapted to the particular pump. Thus, the inventory of spare parts is reduced to a minimum and the only requirement is machining at the proper time the seat support required, thus giving a quick answer to a request for a determined part.

An alternative embodiment of the invention only affects the portion of the seat support which may be manufactured as an independent part or may be a part integrating the hydraulic body of the pump to which is applied, according to the features of the requested spare part. The same occurs with the nature of the seat of the sealing part which, apart from being frustoconical as is common at an angle of about 65°, it may also be planar at 90° without varying the concept of the invention.

A very important factor to be considered of basic interest for the advantage afforded by the invention is that referred to maintenance tasks during which operators are in contact with the fluid being pumped. It is known that during the preparation and pumping steps of oil wells toxic chemical products are used, which obviously are damaging for the operators working with such products and metering them, in spite of the safety measures taken. As mentioned, the contact during reparation of each unit with such chemicals is unavoidable. Since the invention reduces considerably the need of several maintenance operations, the pollution risk also decreases, thus preserving the operators health.

PRIOR ART

Arrangements similar to that of the invention are already known. Examples thereof are the following:

U.S. Pat. No. 6,568 refers to "Improvements in valves and seats therefor". This patent deals with a process for constructing check valves, discharge valves, and others. This invention relates to the combination of metal and non metal parts manufactured with refractory semi-plastic materials, such as those known at that time, such as ebonite, vulcanized rubber, etc.

U.S. Pat. No. 7,291, "Improvements in the manufacturing of washing plugs and valves of general use". This invention was used in plugs, valves and seats of general use. It discloses practicing slots, recesses and cuts in order to locate a metal washer with which the contact and blocking region was defined for closing or regulated the passage of liquid, vapor or gas.

U.S. Pat. No. 7,773 relates to "Improvements to valves and washing plugs", additional to the previous patent. In this patent, valve vanes have a longitudinal helical shape and provides the washing plugs with a part freely rotating within the plug, which carries a seal washer of the parent patent.

U.S. Pat. No. 32,203, "Check Valve". Among other members, it is comprised by an inner diaphragm having a central suction hole for housing the cone of a pump valve, forming a seat on which said check pump valve acts. Over the pump valve its housing has alignment and fastening guides for the retainer fitted into the slots by means of ears. The lower conical portion of the pump valve ends in a cylindrical shape as a guide for centering it into the suction and fastening hole above its seat. The pump valve includes a disk connecting the gasket and the retainer with years preventing the removal of the pump valve from its position.

U.S. Pat. No. 33,753, "Improved Diaphragm Valve"; U.S. Pat. No. 58,492, "Check Valve made of a Resilient Material Disk" and U.S. Pat. No. 109,400 use blocking members made of resilient material which may not be used in the field of the product to be described.

U.S. Pat. No. 161,862 relates to a "Ball Valve seat ring", which being spherical, substantially differs from the object of the instant invention.

U.S. Pat. No. 198,828 refers to "A seal closure to be used in the construction of a fluid valve". It is comprised by three members. The first member is movable with respect to the second member, which has a port communicating with he first member. The third member is located opposite to the second one. The closure includes a port seal portion adapted to be extended through the port, its inner edge being adapted for being in tight contact with the first member, and a body portion surrounding the port seal portion whose opposite sides are against the second and third member and in tight contact therewith and the fluid at the port urges the cited edge of the port seal portion towards a tight contact with the first member. This is a different structure which is not able to withstand high pressures due to its construction. It does not constitute an antecedent for the arrangement of the instant invention.

U.S. Pat. No. 209,373 refers to "Improvements in the functional structure of disk valves". It relates to a body divided into two equal modules. Each module is cylindrical, hollow, having a longer portion with a diameter smaller that that of a second integral portion of less height and larger diameter, comprising a flange with a peripheral wall integral to the base portion connecting to its similar part of the other module. The inner hollow portion of each module is a structural shape defining a first cylindrical space close to the end of the base portion wherein a closure means is housed.

U.S. Pat. No. 210,369, "Valve seat structure" discloses a metal annular seal integral to a U-shaped inner sealing portion and a flexible band portion, which differs from the instant invention.

U.S. Pat. No. 252,849 relates to "Improvements in valves for sludge pumps used in well drilling" of the kind involved in the instant invention, since the valve is comprised by a mount having a conical seat on which a resilient periphery is adjusted typical of a resilient insert applied to a metal plate, including a mount bushing and a pin engaging with the closure means. The characterizing feature is that the metal plate is completely covered by a thermoplastic resilient wrapping including a margin portion provided by its frustoconical adjusting surface which covers its whole widths thus reproducing the conical adjusting surface at the mount seat. Subclaims mention that the plate is a planar disk-shaped part.

The essential feature, as shown in the drawings of the above cited patent, is that said frustoconical plate is wholly covered by a resilient material wrapping and seats, as in most of the known valves of the prior art, on the conical surface of the valve mount seat. Its novelty would be limited to the resilient material wrapping over the cited frustoconical plate.

Therefore, and comparing the specifications and drawings of the patents of the prior art to the object of the instant invention, no coincidences have been found and the problems solved by the instant invention are not overcome by the embodiments of the references of prior art cited.

In an attempt to overcome the mentioned disadvantages, seats made with thermoplastic materials such as poly amides have been made, as inserts into metal bodies or integrally made of such material. These seats were not successful due to the fact that the high pressures force the inserts out of the pump body, are easily deformed as a result of thermal effects, and no improvement is obtained in what concerns to tightness or to the duration of the sealing element.

As known, in oil fields known reciprocating pumping machines are used, which channel the fluid to collecting tanks, from which the oil is pumped to the treating plant. As mentioned above, pumps used during the initial process are those affected by the cited disadvantages, which implies a continuous intervention of corrective maintenance.

Most of the reciprocating pumps manufactured for the oil industry afford acceptable results and a reasonable duration of valve and their seats, provided the pumped fluid is oil free from polluting, corrosive or aggressive substances or elements.

However, in determined fields, conditions may be different due to the materials entrained in the fluid, particularly when carrying out secondary recovery, wherein production has been reduced and use is made of water injection. Since crude oil has a lower density it floats and ascends through the piping, carrying water percentages which sometimes are very high. At present, the recovery process is being carried out using hot water injection, which adds a thermal factor to worsen the conditions under which extraction is effected.

Moreover, this situation is even more critical when the oil pumped is highly viscous.

As mentioned, present pumping equipment uses piston reciprocating pumps in which the most damaged mechanical component is that comprised by the valves and their seats which become useless after a relatively short operating period, thus affecting output of the pumps due to losses produced through the damaged seal, which finally leads to the pump becoming out of service.

As soon as this problem is detected, it should be immediately solved since, as fluid from the well continues flowing, the collecting tank may overflow due to lack of pumping activity.

An additional reason intervening in the destruction of the valve seat, apart from other corrosive agents, is the bacterial action. Particularly, a solution to this problem is afforded by using bactericide chemical products, which requires the use of safe means for operators in charge of metering such chemicals and of maintenance tasks due to the high toxicity via skin or mucous membranes.

Summarizing, during operation of reciprocating pumps the main problems originated are essentially due to several causes such as abrasion, corrosion and thermal effects, and most important, the bacterial attack.

The solution to all the mentioned problems originated day by day in mixture pumping plants as those mentioned, is attained with the arrangement of the invention which produced an important increase in the duration of valve seats, event under the mentioned severe operating conditions. In the private tests, a considerable increase in the continuous operation has been obtained, without maintenance of any kind. Further, upon detection of wear at the valve seat, repairing operations may be carried out easily and the part may be replaced several times at a low cost, assembly not representing a complex task as was till now.

SUMMARY OF THE INVENTION

The valve threaded seat support with quadruple seal of the invention is comprised by a preferably metal body inside which a thread has been practiced, covering the central region comprised between a cylindrical upper mouth having a larger diameter and a lower cylindrical region having a smaller diameter defining a step adjacent the thread fillet, while the valve body has a frustoconical seat at 65° or more, up to 90°, i.e. with a planar seat at the upper portion.

The larger diameter seat forms a peripheral upper edge followed by a cylindrical strip of smaller diameter with a peripheral channel wherein an O-ring is adapted, after which a smaller diameter region is located carrying the thread fillets. At the interior there is a central drill for a rod guiding the valve blocking disk, surrounded by fluid passage ducts. The body of the threaded seat, at least partially, of the blocking disk and of the guide rod are made of a crystalline homopolymer acetalic resin ("Delrin") or of a long chain synthetic polymeric amide with periodical amide groups at the main chain, the generic name of which is "Nylon".

A preferred embodiment of the threaded seat support for valve with quadruple seal of the invention will be now described with reference to the accompanying drawings, which are not to be considered as limiting the scope of the invention, but merely with illustrative purposes.

BRIEF DESCRIPTION OF THE DRAWINGS

FIG. 2 is a schematic cross sectional view of the parts constituting the invention, with a small separation therebetween to better show their interrelation and the regions of the quadruple seal. The valve is open. It includes partial cuts to show the quadruple closure and the threaded joint.

FIG. 3 is an exploded view of the guide rod and the blocking disk.

FIG. 4 is a schematic upper plan view of the valve seat body.

FIG. 5 is an elevation and cross sectional view of the planar blocking disk.

In the drawings the same reference symbols indicate the same or corresponding parts.

DETAILED DESCRIPTION OF THE INVENTION

Figure 1:
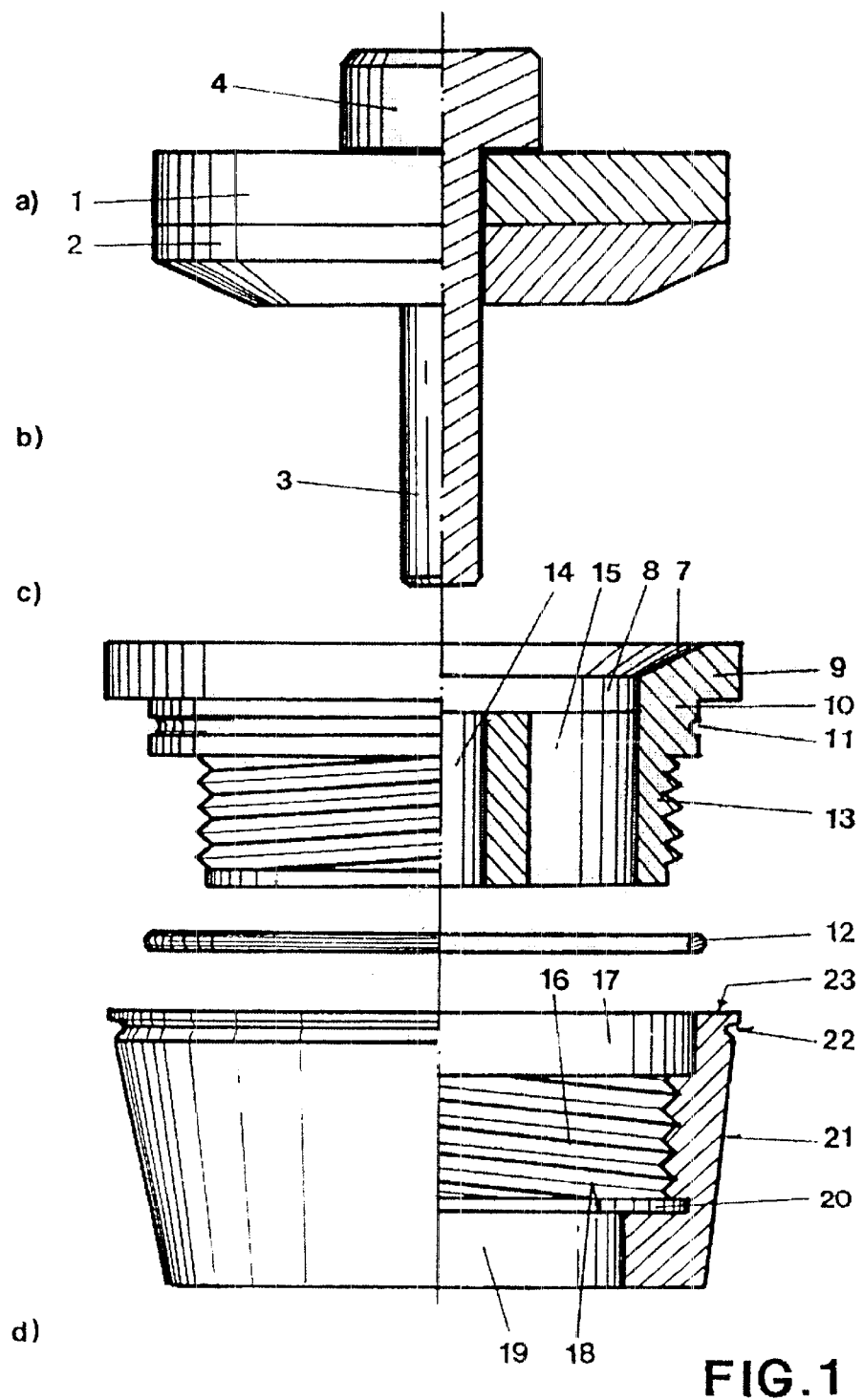
FIG. 1 is a side elevation exploded view of the components of the invention, having one half in cross section.

According to the figures, the invention is comprised by four essential forming elements wherein a) is the blocking means with its axial guide b), being c) the seat valve body and d) the seat support cap. a), b) and c) are made of a plastic material such as any of the long chain synthetic polymeric amides having periodic amide groups as a part of the main chain, known by the generic name of "Nylon", and also the crystalline homopolymeric acetalic resins, of the kind known as "Delrin", the material being selected taking into account the temperatures involved.

In one of the embodiments prepared for withstanding high pressures, e.g. higher than 50 kg/cm2, the blocking disk a) is double since it is comprised by the blocking disk 1 attached to a strong backup disk 2, which may be made of steel. Both disks are fixed over component b) which is comprised by a guide rod 3 provided with an upper head 4 wherein spring 5 is functionally adapted (FIG. 2).

When pressures are lower than 50 kg/cm2, part b) may be made totally of plastics 6, as shown in FIG. 5.

With reference to FIGS. 1, 2, and 4, wherein part c) may be seen, the valve seat is substantially cylindrical and is completely made of said synthetic materials. It has the upper part forming the seat 7, in this case of conical shape, with an angle of about 65°. The angle may also reach 90°, in which case the seat will be planar to cooperate with disk 6 of FIG. 5. A chamber 8 is defined in this upper part.

Part c) has at its outside a peripheral edge 9 having a diameter larger than that of the body, followed by a cylindrical step 10 into which channel 11 has been cut wherein an annular seal fits constituted by the O-ring 12. The rest of the body has fillets forming the thread 13. Inside there is an axial conduit 14 for guide 3 and through conduits 15, distributed radially, as shown in FIG. 4, and through which the fluid pumped passes.

Part d) is comprised by the valve seat support cap, and has an inner thread 16, an upper chamber 17, and an inner edge 16 flanking the lower opening 19, following the space 20 formed by the clearing of the threaded surface. This edge 18 is a planar annular surface defining a lower additional blocking seat in this part, as will be explained below. At its outside, the body 21 is frustoconical and has an annular mouth 22 adjacent the upper plane.

FIG. 2 further shows, apart from the valve arrangement, a scheme of the hydraulic body H of the reciprocating pump wherein each space housing the corresponding valves is machined, these valves being equal to that described. This figure shows closure cover T, with anchorage R for spring 5 of the closing member a), b).

A constructive alternative admits that the seat support body c) forms part of body H of the pump, which implies that it has been so machined.

Considering the assembly of the invention as a spare part, perhaps it may be easier for the quick replacement of the damaged parts by the invention, that the pump body be already provided with the frustoconical space for the seat and seat support assembly.

Operation

The preferred embodiment of the invention being so described, the description will be completed with the functional and operative relationship between the constituting parts and the result obtained.

Apart from the essential quadruple tight seat system described, the selection of the materials is also important which, as mentioned, should be chosen according to the temperatures of the fluid involved, between Grilon, Nylon and Delrin.

Pressures may vary from less than 50 kg/cm2 to higher than such value, therefore, a metal backup 1 has been added to the blocking disk 2.

Steels preferred are thermal treated alloy steels.

Based on the above, maintenance or replacement of the valve seats of the invention is easy.

The steel seat support may be initially mounted to body H of the reciprocating pump as an integral part thereof, or it may have a conical housing for receiving same. Most frequently, the arrangement is prepared such that part d) has the conical body 21 to be adapted to that place. Part c) is threaded by means of a special tool since threads 13 and 16 are filleted without any play. The seat support c), at the end of the threading operation, bears the lower annular surface 23 on the planar surface 18 of the inner edge of part d), thus obtaining a first seal, see Z in FIG. 2.

Ring 12 forms the second seal and acts as a self-braking device with the cylindrical wall of chamber 17 of the seat support d), see Y in FIG. 2. These two seals are permanent seals and due to the perfect threaded of both parts a complete tightness is attained at every time.

The third seal, indicated with X in FIG. 2 is the operative seal of the valve and is comprised by the blocking member a)–b) through the disk plastic surface with its closing cone 2 and the corresponding tapered surface 7 of body c) which cooperate therebetween.

For the case of the planar blocking disk 6, the third seal is obtained by closure with the annular contact between the planar surface located at part c) on the edge 9 (not shown case).

The fourth seal W is produced between the lower portion of the peripheral edge 9 of part c) and the upper annular contour 23 of the part designated d).

The arrangement may be applied to pump bodies with single or double effect pistons upon making simple modifications.

Operation of the reciprocating pump is simple. When the piston advances, it comprises the fluid aspirated inside body H opening the corresponding check valve (blocking disk 2) against its spring 5 extended between the shoulder R of cover T and head 4 of the guide rod 3, which axially displaces within the hole 14 of part c), as shown in FIG. 2. The mixture of hydrocarbon, water and polluting substances will pass through conduits 15 of the sear support c) of the valve, forcing it towards the piping reaching the treatment plant. When the piston retracts, the check valve is closed, disk 2. If this closure were not tight, part of the fluid would return this affecting the pump yield. Normally, abrasion and corrosion agents affect the closure forming pores and cracks which damage the tightness of the closure, so that the product returns through the same path, thus reducing the yield of the plant. When losses increase, replacement of damaged parts is required. Problems and faults are thus produced.

The invention, comprising the use of a seat support threaded to the valve seat, 13–16, overcomes the cited disadvantages. The invention resists high temperatures, replacing Nylon by Delrin resin or the like, according to the thermal level. The invention employs the blocking disk 6, only made of Nylon, or with the addition of the metal reinforcement 1,2 when under high pressures.

Another advantage is the manufacture of the arrangement of the invention at the plant, thus requiring a minimum inventory of spare parts. According to the existing machinery, with valves of different sizes, demand may be satisfied preparing a discrete amount of spares. To this end, two or three models are machined, according to the size of the pump bodies. For example, small, medium and large size devices. Thus, replacement may be quickly effected with the corresponding seat model.

With the optimum features of the arrangement of the invention, attained by the structural concept and the correct selection of the materials from which parts are made. In this way, the stoppage time due to maintenance purposes is minimized. Fluid losses are practically null; life of valves is increased thus requiring less maintenance operations. All this results in an important increase in production and an outstanding decrease of the operative cost.

The invention should not be limited to the above-described preferred embodiment, but should be limited solely by the scope of the following claims.

What is claimed is:

1. Threaded seat support for valve with quadruple seal, such as aspiration and exhaust check valves used in reciprocating hydraulic pumps, characterized in that the threaded seat support cap is comprised by a planar frustoconical metal body, inside which a thread has been made at a central region comprised between the upper mouth forming a larger diameter chamber and a lower cylindrical region, of smaller diameter, defining a planar step adjacent the end of the thread fillet; while the valve body provides the seat at its upper surface, which has a larger diameter forming a projecting peripheral edge, followed by a cylindrical strip of smaller diameter which has a peripheral channel carrying an O-ring; following the cylindrical strip thread fillets are arranged at a smaller diameter region; while that inside the valve body there is an axial drill for a guide rod of the blocking disk of the valve, surrounded by the fluid passage conduits; the bodies of the threaded seat, of the blocking disk and, at least partially, of the guide rod, are made by a crystalline homopolymer acetalic resin (Delrin) or by a long chain synthetic polymer amide with periodical amide groups as a part of the main chain (Nylon), defining the assembly at least four tight seals.

2. Threaded seat support for valve with quadruple seal, as claimed in claim 1, characterized in that said blocking disk made of synthetic material has a metal backup.

3. Threaded seat support for valve with quadruple seal, as claimed in claim 1, characterized in that said four tight seals are defined by the operating engagement between the surfaces of the valve body and its blocking disk; by the structural contact between the O-ring and the annular edge of the larger diameter chamber located at the mouth of the seal support cap, between said planar steps adjacent the thread fillet of the seal support and the lower annular surface of the valve body and between the peripheral edge of the valve body and the annular edge of the seat support cap.

4. Threaded seat support for valve with quadruple seal, as claimed in claim 1, characterized in that the shape of the valve body seat at the upper surface is frustoconical and has an angle of about 65°, cooperating with the corresponding blocking disk.

5. Threaded seat support for valve with quadruple seal, as claimed in claim 1, characterized in that said valve body has a planar seat upper surface, cooperating with the respective planar blocking disk.

6. Threaded seat support for valve with quadruple seal, as claimed in claim 1, characterized in that said thread fillets at the seat support cap and at the valve body have zero tolerance, thus adjusting in a tight manner.

7. Threaded seat support for valve with quadruple seal, as claimed in claim 1, characterized in that said seal support cap is integral to the pump body.

* * * * *